United States Patent Office 3,452,126
Patented June 24, 1969

3,452,126
METHOD OF POST-CURING A BENZOYL PEROXIDE CURED FLUOROELASTOMER COMPOSITION
Jerry K. Sieron, Dayton, Ohio, assignor to the United States of America as represented by the Secretary of the Air Force
No Drawing. Filed Dec. 9, 1966, Ser. No. 600,668
Int. Cl. B29b 25/00
U.S. Cl. 264—102        2 Claims

ABSTRACT OF THE DISCLOSURE

Process for the preparation of low compression, high temperature resistant, benzoyl peroxide cured fluoroelastomer composition wherein said composition is heated at about 200° F. at about atmospheric pressure. The composition is then heated in the range of about 200–400° F. under reduced pressure to remove substantially all volatiles and thereafter further post cured by heating in the range of 400–550° F. at atmospheric pressure.

---

The invention described herein may be manufactured and used by or for the United States Government for governmental purposes without the payment to me of any royalty thereon.

This invention deals with low compression set materials for use as seals, gaskets, flexible connectors, and the like. More particularly, the invention deals with the preparation of novel low compression set, high temperature resistant, peroxide vulcanized fluoroelastomers for use as O-ring seals, gaskets, flexible connectors, and the like in the hydraulic and fuel systems of high Mach number aircraft.

The use of rubber and synthetic elastomers in seals and gaskets is well known. Rubber, for example, has found wide use in the sealing art because of its elasticity, it being important that a good seal material be not only compressible but that it resist compression and "press back" tightly against the surfaces being sealed.

Many elastomers, when first prepared and when under relatively normal temperatures and pressures, exhibit the properties necessary for a good seal but, while under compression and at elevated temperature, harden (take a set), and cease to "press back." Such hardened seals cannot prevent leakage, particularly of fluids under pressure, and therefore have a limited usefulness.

Advances in modern technology have created demands for machines and devices which must operate in environments at relatively high temperatures. Many of these devices require the presence of fuel or lubricants under relatively high pressure. For example; jet propelled, high Mach number aircraft inculde devices which comprise high pressure seals exposed to temperatures at high as 500° F. for long periods of time. Rubber cannot be used as a seal in such devices and the workers in the art have been investigating the potentialities of synthetic elastomers.

Among the synthetic elastomers vulcanized fluoroelastomers, because of their excellent chemical resistance and fair heat resistance, have been considered as potentially valuable sealing materials. Thus, diamine cured fluoroelastomers have been tested but have a high compression set. Specifically, they exhibit undue hardening and loss of resilience when operating at 500° F. Peroxide cured fluoroelastomers also have a high compression set and have not been employed as seals. Normal post curing operations involve step cures to 400° F. and, under these conditions, sponging of peroxide cured fluoroelastomers due to inadequate cross-linking is a severe problem.

OBJECTS

It is therefore an object of this invention to provide a method for making a temperature resistant, low compression set elastomer for use as O-rings, gaskets, flexible connectors, and the like.

It is a specific object of the invention to treat a peroxide cured fluoroelastomer in a manner to effect the removal of volatile constituents therefrom and convert said fluoroelastomer into a novel and valuable sealing material.

I have now found that the foregoing and related objects can be attained in the method of post-curing a benzoyl peroxide cured fluoroelastomer composition to produce a temperature resistant, low compression set material; said method comprising the step of heating said composition under reduced pressure to effect the removal of volatile decomposition products.

In a preferred embodiment of the invention I heat the elastomer composition under a low pressure, substantially that of a vacuum; the temperature being elevated stepwise within the range of about 200°–400° F. For example, I prefer to raise the temperature of the composition in about 50° F. increments and hold the composition at each temperature level for about one day. It will be apparent to one skilled in the art that there can be considerable variation in the temperatures chosen, the increments of temperature, the pressure, and the time of heating at each temperature; it being important only to remove a substantial proportion of the volatiles either present in the composition at the time of curing or developed subsequently as a result of the heating. Thus it appears that the successful removal of substantially all volatiles which develop up to a temperature of about 400° F. permits of the subsequent use of the elastomer composition as a seal at temperatures up to about 550° F.

In another preferred embodiment of the invention, I post cure a benzoyl peroxide cured fluoroelastomer composition at about 200° F. and at atmospheric pressure for about a day prior to carrying out the heating of the composition under reduced pressure. This step effects the the termination of free radical cross linking within the composition before the process of removing volatiles begins.

In yèt another preferred embodiment of the invention and following the removal of substantially all volatiles, I post cure the composition by heating it in the range of about 400°–550° F. This latter step can be carried out at atmospheric pressure.

The method is applicable to any fluoroelastomer; for example, polymers and copolymers of vinylidene fluoride, perfluoropropylene, chlorotrifluoroethylene, and the like.

EXAMPLE

A vinylidene fluoride-perfluoropropylene copolymer (100 parts by weight), magnesium oxide (15 parts), MT carbon black (30 parts), and benzoyl peroxide (3 parts) were mixed. The composition was formed into button-shaped gaskets which were vulcanized by press curing for 60 minutes at 260° F. using well-known procedures. The gaskets were then post cured in the following sequence of steps:

| Step | Time, hrs. | Temp. °F. | Pressure, mm. Hg. | Set, percent | Tensile, p.s.i. | Elongation, percent | Hardness Shore A, pts. |
|---|---|---|---|---|---|---|---|
| 1 | 24 | 200 | 760 | | | | |
| 2 | 24 | 200 | 1 | | | | |
| 3 | 24 | 250 | 1 | | | | |
| 4 | 24 | 300 | 1 | | | | |
| 5 | 24 | 350 | 1 | | | | |
| 6 | 24 | 400 | 1 | 72.8 | | | |
| 7 | 8 | 500 | 760 | 56.7 | | | |
| 8 | 16 | 500 | 760 | 41.8 | | | |
| 9 | 96 | 500 | 760 | 26.3 | 2,285 | 385 | 76 |
| 10 | 168 | 550 | 760 | Substantially unchanged | | | |

As indicated, the gaskets were tested for compression set. In this test the gaskets are held at 400° F. for 72 hours under a 25 percent compression. The pressure is then released and the gaskets are allowed to expand freely. If the gasket button expands and returns to its original height, it has zero compression set. If it does not expand and retains its compressed height, it has 100 percent compression set. Test gaskets reached a compression set of 26.3% which, under the severe conditions of the test, is very, and surprisingly good.

Control gaskets where were not heated in vacuum as indicated but which were post cured at atmospheric pressure showed substantially 100 percent compression set and could not be heated to 500° F. Comparable diamine cured polymer buttons were hard and had substantially 100 percent compression set.

The tensile of 2285, the elongation of 385, and the Shore hardness of 76 in the tested gasket indicates that the latter still retains the general properties characteristic of elastomers before they have been subjected to adverse environments.

It is to be understood that the foregoing example and description are for the purposes of illustration only, and that various changes may be made therein withount departing from the spirit and scope of the invention.

I claim:
1. The method of post-curing a benzoyl peroxide cured fluoroelastomer composition to produce a temperature resistant, low compression set material comprising the steps of (a) heating said composition at about 200° F. at about atmospheric pressure; (b) heating said composition in the range of about 200–400° F. under reduced pressure to effect the removal of substantially all volatiles; and (c) thereafter further post-curing the composition by heating it in the range of 400–550° F. at atmospheric pressure.

2. The method according to claim 1 wherein said reduced pressure is substantially that of a vacuum.

References Cited

UNITED STATES PATENTS 3,029,473    4/1962    Greenberg _____ 264—347

OTHER REFERENCES

Levy & Vanderbilt, the Society of the Plastics Industry, Inc., Evaluation and Development of Glass Reinforced Plastic Pipe for the Petroleum Industry, 1960, section 13D, pp. 1–3 (264/236).

Conroy, Honn, Robb & Wolf, Rubber Age, Kel-F Elastomer, 1955, vol. 76, No. 4, pp. 543–550 (260/92.1).

DONALD J. ARNOLD, Primary Examiner.

J. H. SILBAUGH, Assistant Examiner.

U.S. Cl. X.R.

264—236, 347; 260—92.1